United States Patent [19]

Zaharchuk et al.

[11] Patent Number: 4,727,296

[45] **Date of Patent: * Feb. 23, 1988**

[54] LIGHTING SCENE CONTROL PANEL AND CONTROL CIRCUIT

[75] Inventors: Walter Zaharchuk, Macungie; Joel S. Spira, Coopersburg, both of Pa.

[73] Assignee: Lutron Electronics Co., Inc., Coopersburg, Pa.

[ * ] Notice: The portion of the term of this patent subsequent to Mar. 11, 2003 has been disclaimed.

[21] Appl. No.: 821,424

[22] Filed: Jan. 22, 1986

Related U.S. Application Data

[62] Division of Ser. No. 526,321, Aug. 25, 1983, Pat. No. 4,575,660.

[51] Int. Cl.[4] .............. H02P 5/00

[52] U.S. Cl. .............. 315/295; 315/291; 315/208; 315/293

[58] Field of Search .............. 315/312, 291, 295, 208; 362/23, 800; 340/722, 707; 338/117, 125, 160

[56] References Cited

U.S. PATENT DOCUMENTS

| | | | |
|---|---|---|---|
| 3,422,418 | 1/1969 | Simoneau | 340/722 |
| 3,474,438 | 10/1969 | Lauher | 340/722 |
| 3,898,643 | 8/1975 | Ettlinger | 340/707 |
| 4,575,660 | 3/1986 | Zaharchuck et al. | 315/295 |

FOREIGN PATENT DOCUMENTS

| | | |
|---|---|---|
| 230360 | 3/1925 | United Kingdom . |
| 547649 | 9/1942 | United Kingdom . |
| 1090891 | 11/1967 | United Kingdom . |
| 1387856 | 3/1975 | United Kingdom . |

*Primary Examiner*—David K. Moore
*Assistant Examiner*—Michael Razavi
*Attorney, Agent, or Firm*—Ostrolenk, Faber, Gerb & Soffen

[57] ABSTRACT

A plurality of groups of linearly adjustable control potentiometers control respective lights of a given light scene in a given area. A particular group of potentiometers to control the scene is selected by a respective push-button switch on the control panel. Each of the potentiometer control sliders has an LED which is illuminated when its group of potentiometers is selected. Each of the control potentiometers controls a respective dimmer control circuit. Respective fader circuits are connected to each dimmer control circuit. All fader circuits are adjusted by a single potentiometer having a logarithmic response function. The single adjustment potentiometer is mounted on the control panel. All of the dimmer control circuits are remotely located from the control panel. The control panel is covered by a solid cover or a translucent cover through which only illuminated LEDs on the potentiometer sliders are visible. Thus, the group of potentiometers controlling the scene is visible and the adjustment position of each individual potentiometer of the group relative to the other potentiometers of the group is visible.

4 Claims, 4 Drawing Figures

LIGHTING SCENE CONTROL PANEL AND CONTROL CIRCUIT

This is a division of application Ser. No. 526,321 filed Aug. 25, 1983 now U.S. Pat. No. 4,575,660.

BACKGROUND OF THE INVENTION

This invention relates to lighting scene controls, and more specifically relates to a novel circuit and panel for such control systems, U.S. Pat. No. 4,575,660.

Lighting control systems are known wherein groups of lights within a room can be individually dimmed by different relative amounts and, upon the pressing of an appropriate switch, one of a plurality of dimming scenes which is preset can be automatically selected. Past arrangements to obtain this result frequently emply rotary potentiometers, with all dimming equipment and control equipment contained at the same location. This location frequently was removed from the area being lighted so that adjustment of the various lights in the area for different scenes was complicated. Moreover, in prior art arrangements it was difficult to determine the relative adjustment of potentiometers of given groups of controls which define respective single lighting scenes relative to one another.

It is also known in the prior art to provide fade circuit means to control the fading of the light from one adjustment level to another as the lighting scene is changed. Each fade control circuit had a respective fade rate adjustment which required individual adjustment. These adjustments did not account for desirable changes in fade speed, depending on the portion of the fade rate range being used.

BRIEF DESCRIPTION OF THE INVENTION

A novel control system and control panel is provided in accordance with the invention where each lighting scene for a given set of light fixtures is controlled by a corresponding group of a plurality of linearly adjustable slide potentiometer controls which are arranged parallel to one another and move coextensively with one another. Push-bottom switching means is provided to select a particular preset group of potentiometer controls which control the dimming level of the lighting fixtures. The dimmer control circuitry may be located remotely of the control panel so that the relatively bulky control circuit can be contained in a suitable remotely positioned electrical cabinet while the control panel can be located conveniently in the room being controlled or illuminated.

Each of the potentiometer sliders carries a respective viewable LED or other suitable light source wherein only the LEDs of the sliders which have been switched to control the lighting fixtures are illuminated, thus indicating which group is controlling the scene and further indicating the relative adjustment of the various potentiometers within the group relative to one another. The control panel is enclosed by either an opaque cover or a translucent cover which makes visible only the illuminated LEDs.

While the LEDs are preferably on the slider, other arrangemens are possible to indicate the adjustment level of the potentiometer. For example, circuitry may be provided for a stationary LED associated with a potentiometer to control the output light intensity, flash frequency, color or the like as a function of potentiometer position.

If desired, such LEDs can be fixed to any movable adjustment member, including a rotary potentiometer knob or shaft, to visually indicate the selection of the potentiometer for a control function and the setting of the potentiometer. The LED in this case can also be stationarily mounted relative to the rotary or other adjustment member and can indicate selection and/or adjustment position of the adjustment member by control of light intensity, flash frequency, color or the like.

As a further feature of the invention, a fade circuit is provided for each of the remotely located dimmer controls and a novel common adjustment potentiometer is made available for each of the fade circuits, which common adjustment potentiometer is located in the control panel. The push-button switches which are used to select a desired scene operate in conjunction with magnetic latching relays which activate the appropriate group of control potentiometers. Also provided are diode steering logic circuits which steer the appropriate potentiometer outputs to the fader inputs associated with each circuit being individually controlled.

The use of linear potentiometers as the adjustment potentiometer enables logical physical grouping of a relatively large number of lighting zones or of individually controlled light fixtures in a relatively small control panel area. The linear controls will occupy considerably less area than even miniature rotary potentiometers which require relatively large knobs to enable easy, accurate adjustment with observation of the position of the control.

A transconductance amplifier fader circuit is also employed to allow the fading function to be implemented with relatively few parts compared to standard fader circuits. The use of a single fade rate adjustment potentiometer for the multiple faders further reduces space requirements and simplifies setup times since only one fader adjustment must be made rather than one for each channel.

The fader rate adjustment is designed to have a logarithmic response of fade rate versus adjustment potentiometer rotation angle so that ease of adjustment to desired rates is preserved over the entire adjustment range. A fade bypass circuit is also included to eliminate the fade functions upon initial turn-on of the system from a full off condition so that the user does not have to wait for lights to fade up slowly from a zero output.

DETAILED DESCRIPTION OF THE DRAWINGS

Figure 1:
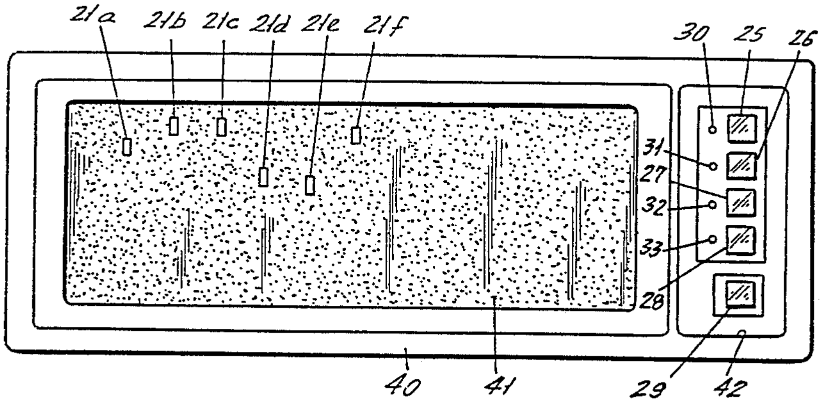
FIG. 1 is an elevation view of the front panel cover of a control system of the present invention.
Figure 2:
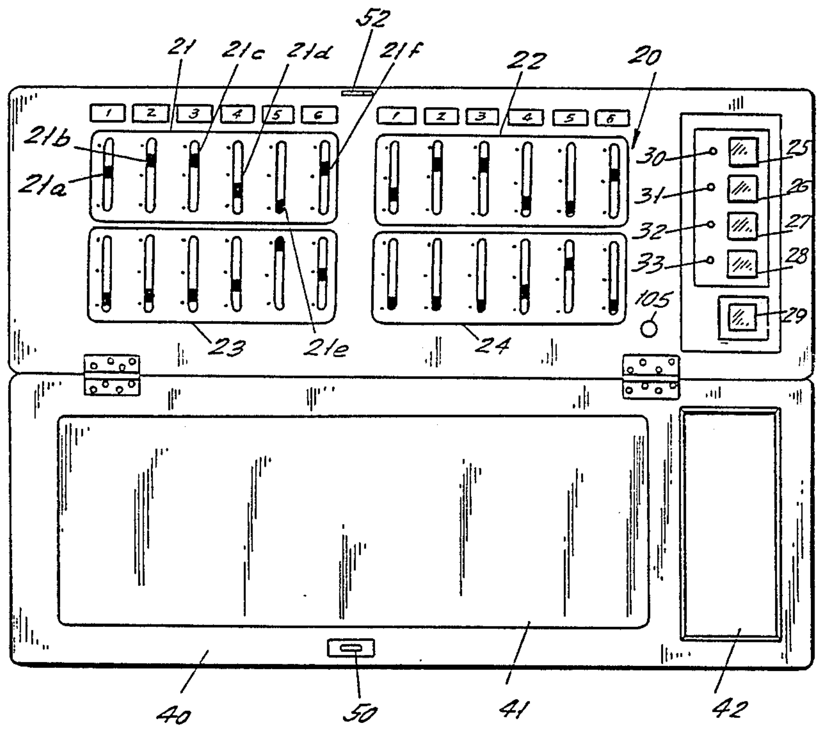
FIG. 2 shows the panel of FIG. 1 opened to expose the front control panel.

Referring first to FIGS. 1 and 2, the control panel illustrated has an internal panel 20 (FIG. 2) which contains four groups 21, 22, 23 and 24 of linear potentiometers. Each potentiometer has a slider control which extends through slots in the panel 20 so that the sliders can be manually moved up and down in FIG. 2. The protruding ends of the sliders are seen in FIG. 2 as illuminated end regions 21*a* through 21*f* which carry and are illuminated by respective LEDs. Similar slider handles which also contain LEDs which may be illuminated extend through the panel for each of groups 22, 23 and 24. Note in FIG. 1 that only LEDs 21*a* through 21*f* are illuminated.

Next contained in the panel 20 are a plurality of touch-bottom switches 25, 26, 27 and 28, each of which is operable to activate a respective one of groups 21, 22, 23 and 24, respectively. A further touch button 29 is provided which is operable to turn off the entire system upon its depression. Four LEDs 30, 31, 32 and 33 are associated with touch buttons 25, 26, 27 and 28, respectively and are illuminated when their respective touch button is pressed in order to cause their respective group 21, 22, 23 or 24 to assume scene control, as will be later described.

A panel cover 40 is hinged to control panel 20 and contains a smoked translucent window 41 and a slot 42 therein. When the cover 40 is closed, the touch buttons 25, 26, 27 and 28 and their respective pilot LEDs 30, 31, 32 and 33 are exposed through slot 42. The smoked translucent window 41, however, covers the potentiometer sliders of groups 21, 22, 23 and 24. Thus, as schematically shown in FIG. 1, if touch button 25 is depressed to activate the potentiometers of group 21, the LEDs 21*a* through 21*f* are visible through the smoked window 41. Thus, one can visually observe, first from the illumination of LED 30 and, second, from the illumination of the LEDs 21 through 21*f*, that the lighting scene is being controlled by group 21. One can also observe the relative adjustment of the various chanels or the relative dimming adjustment of the individually controlled fixtures of the scene relative to one another by observing the position of the LEDs 21*a* through 21*f* relative to one another.

If desired, a hidden security latch, including latch members 50 and 52 in FIG. 2, can be provided to hold latch cover 40 closed and deter unauthorized tampering with preset lighting scenes.

Figure 3:
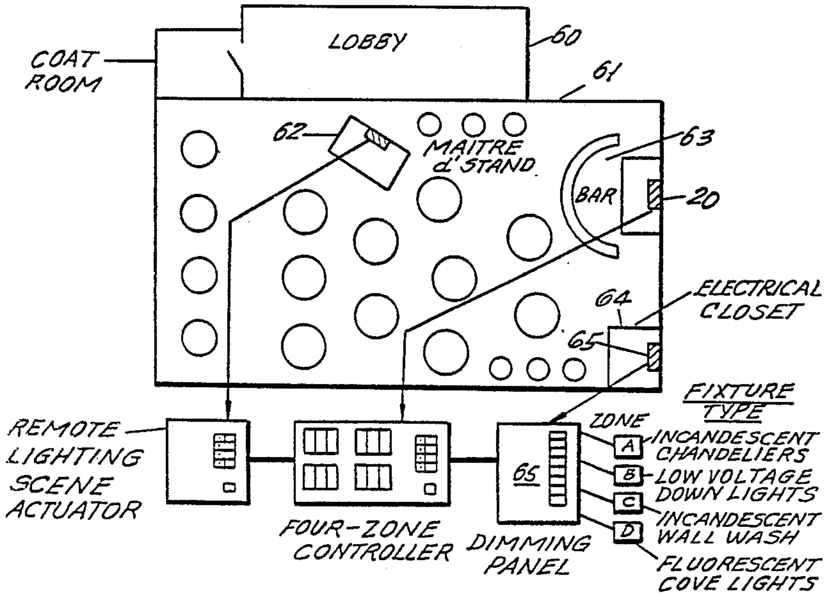
FIG. 3 is a plan view of a room which employs the novel system of the invention.

FIG. 3 illustrates the manner in which the novel system of the invention can be applied, for example, to a restaurant. The restaurant of FIG. 3 contains a lobby 60 and main dining room 61. Within the main dining room there may be a reception stand 62, a bar area 63 and a remote electrical enclosure or closet 64. The lighting within the restaurant room 61 may include the following four different types of lights, hereinafter referred to as "zones" or "channels" or "groups":

(A) chandeliers (B) low voltage down lights (C) incandescent wall wash (D) fluorescent cove lights Each of the above lighting zones should be adjusted differently at different times during the day. For example, different settings should be made for breakfast, lunch, dinner or cocktails. These desired adjustment might be according to the following table:

| Scene | Restaurant Function | Zone A | Zone B | Zone C | Zone D |
|---|---|---|---|---|---|
| 1 | Breakfast | 70% | 80% | 60% | 90% |
| 2 | Luncheon | 40% | 70% | 80% | 90% |
| 3 | Dinner | 20% | 40% | 40% | 60% |
| 4 | Cocktails | 10% | 20% | 20% | 40% |

The control panel of the type shown in FIGS. 1 and 2 can be employed to preset these adjustments. More specificlly, each of the lighting fixture groups A, B, C and D is controlled from circuitry contained in a relatively large dimming panel schematically shown as panel 65 which is contained in a remote electrical closet 64. The control panels of FIGS. 1 and 2, however, are conveniently located at region 20 in the bar area 63. A remote lighting scene activator serving the function only of switches 25 through 29 of FIGS. 1 and 2 can be located at the reception area 62. If desired, manual potentiometer or other adjustments can be located with or independently of the remote lighting scene activator to enable manual adjustment of any channel or circuit without changing the preset pattern of the main controller.

The dimming levels specified in the table for scene 1 are adjusted as by a lighting expert by adjustment of the linear adjustment potentiometers of group 21. The relative dimming percentages which are then obtained can be instantly recalled by depression of the push button 25 as will be later described. Each of the settings for scenes 2, 3 and 4 of the above table are similarly made in potentiometer groups 22, 23 and 24, respectively. Restaurant personnel will never need to adjust the sliders to establish the lighting levels.

Figure 4:
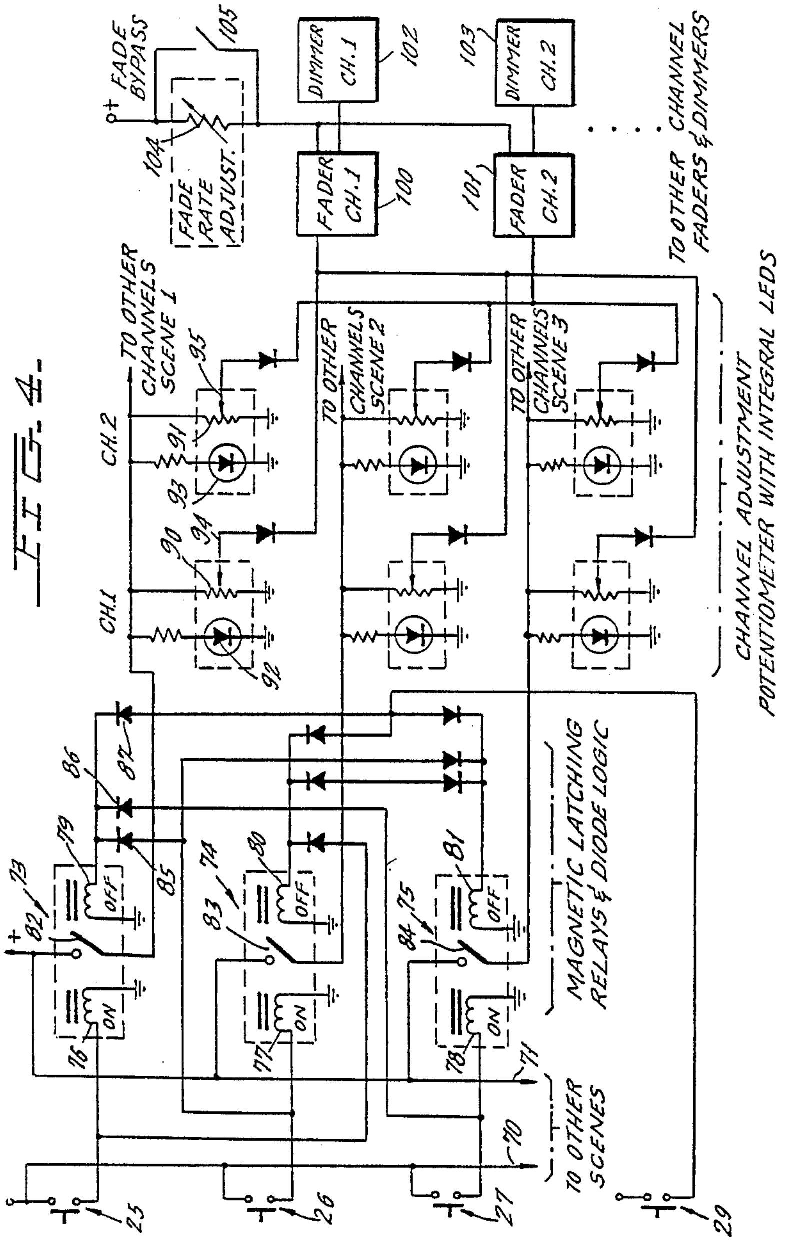
FIG. 4 is a circuit diagram of the present invention.

Referring next to FIG. 4, there is shown therein a circuit diagram, partially in block form, of the control circuit for carrying out the control system shown in FIGS. 1 and 2. For the sake of simplicity, only three scene circuits are shown and only two chanels are shown for each of the three scenes. Thus, in FIG. 4 there is schematically illustrated push-button switches 25, 26, 27 and 29 which are momentary close switches. These switches are connected in series with an appropriate d.c. voltage source shown as having a positive d.c. terminal throughout the circuit of FIG. 4. Any number of scenes can be used in the circuit of FIG. 4 where additional scene circuits are added onto the extending lines 70 and 71.

Each of switches 25, 26 and 27 is connected to operate conventional commercially available magnetic latching relays shown as relays 73, 74 and 75, respectively, each of which contains on-coils 76, 77 and 78, respectively, and off-coils 79, 80 and 81, respectively. Energization of these coils will open and close the relay contacts 82, 83 and 84, respectively. A novel diode logic configuration is employed including three diodes for each off-coil 79, 80 and 81 to ensure that only one relay contact is closed at any instant. By way of example, three diodes 85, 86 and 87 are employed for off-coil 79. If any one of contacts 26, 27 or 29 is closed, the coil 79 will be energized and contact 82 will open. Contact 82, however, remains closed following the closure of only switch 25. This circuit ensures that only one scene can be presented by depression of one of the push buttons 25 to 27.

The contacts of each of the magnetic latching relays are then connected to the individual channels of the group of controlled potentiometers associated with the scene selection push buttons 25, 26 or 27, respectively. Thus, contact 82 is connected to two channels, each containing linear potentiometers 90 and 91, respectively, as well as other indentical channels depending upon the number of channels there are provided in the group. For example, in the arrangement of FIG. 2, there would be six channels with potentiometers 90 and 91 corresponding to the potentiometers containing sliders 21*a* and 21*b* in FIG. 2.

Also provided for each of the potentiometer sliders 90 and 91 are the LEDs 92 and 93, respectively, which, as shown in FIG. 2, are fixed directly atop each manually accessible slider.

The output at the potentiometer taps 94 and 95 of FIG. 4 are then connected to the inputs of fader circuits 100 and 101, respectively, where the number of fader circuits will correspond to the total number of zones or channels for each scene. In the case of the arrangement of FIG. 2, there would be six fader channels. The output of each of the fader circuits are then connected to dimmer control circuits 102 and 103, respectively, where these dimmer control circuits can take the form, for example, of the circuit shown in U.S. Pat. No. 4,350,935.

In order to control the time constant of the fader circuits 100 and 101, a common fader rate adjustment potentiometer 104 is provided which adjusts the input to the fader circuits 100 and 101. As described previously, the adjustment potentiometer 104 may be a rotational potentiometer, and is designed to have a logarithmic response of fade rate versus potentiometer rotation. This simplifies the adjustment of each channel over the entire adjustment range of the system.

In order to bypass the fade mode of operation, a parallel relay switch 105 is provided which is arranged to be closed by a suitable circuit (not shown) for at least a few seconds following the initial turn-on of the system so that the user does not have to wait for the lights to fade from an off condition to their set condition.

Each of the known dimmer control circuits 102 and 103 as well as those of the other channels controls their respective lighting fixtures in the manner described in the above-noted patent. Significantly, these dimmer control circuits can be located in the dimming panel 65 located in the electrical closet of FIG. 3. This simplifies the equipment needed at the control location and permits the use of an architecturally pleasing control panel design. Note further that the fader control potentiometer 105 is also contained in the control panel 20 of FIG. 2 and permits fade rate adjustment between scenes from 1 to 60 seconds to be adjusted by a screw driver.

It will be observed that the novel use of magnetic latching relays and diode logic requires only a momentary pulse of energy on one coil to turn on a group and on another coil to turn the group off. This eliminates the electronic latching circuitry which was previously required to perform this memory function. Note also that the novel magnetic latch system retains its set state even during a power failure so that the system will return to its last set state automatically upon the return of power without the need for operator action or extra support circuitry such as batteries or the like.

In order to turn the system off, it is necessary only to touch the momentary switch 29 which then deenergizes all of the magnetic latch off-coils. When all scenes are deenergized by the off-button, other logic circuitry (not shown) will cause the power feed to the dimmers to be interrupted so that the lights will immediately extinguish.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A control panel for an electrical circuit for a lighting scene control, comprising:

a plurality of potentiometers having respective linearly movable potentiometer adjustment members; each of said adjustment members movable along coextensive parallel, laterally spaced linear paths between respective first and second end positions; the position of any given one of said adjustment members on said path being effective to set the illumination intensity of a lamp associated with said given adjustment member; each of said adjustment members having a respective position indicator associated therewith; said position indicators having fixed predetermined lateral spacing from adjacent ones of said indicators; a planar control panel; each of said indicators comprising light source means for emitting light from longitudinally varying positions along the front of said control panel wherein the longitudinal position of said emitted light visually indicates the longitudinal position of its said respective adjustment member between said two end positions; said adjustment members and said indicators being mounted on and accessible from the front of said planar control panel; and a translucent control panel window movable from an open position to a closed position relative to said front of said planar control panel; said panel window being disposed immediately in front of and coplanar with at least a portion of the area of said front of said planar control panel when in its said closed position; said translucent window having light transmission characteristics such that, when said light source means of said indicators are energized, said emitted light is visible through said control panel window to visually display the longitudinal adjustment position of their said respective adjustment members and, when said light source means are not energized, they are substantially masked from view.

2. The light control system of claim 1 wherein each of said indicators is fixed to said planar control panel.

3. The device of claim 1 wherein said planar control panel has parallel elongaed slots therein; each of said adjustment members including a shaft extending through respective ones of said slots; each of said adjustment members having a control knob fixed to its said shaft and disposed on the front of said planar control panel, whereby said shafts, said knob and said slots are masked from view when said translucent control panel window is in its said closed position.

4. A control panel for an electricl circuit for a lighting scene control, comprising;

a plurality of groups of potentiometer controls, each of said groups mounted within a distinct respective area of a control panel, each of said groups including a plurality of potentiometers having respective linearly movable potentiometer adjustment members; each of said adjustment members movable along coextensive parallel, laterally spaced linear paths between respective first and second end positions; the position of any given one of said adjustment members on said path being effective to set the illumination intensity of a lamp associated with said given adjustment member; each of said adjustment members having a respective position indicator associated therewith; said position indicators having fixed predetermined lateral spacing from adjacent ones of said indicators; each of said indicators comprising light source means for emitting light from longitudinally varying positions along the front of said control panel wherein the longitudinal position of said emitted light visually indicates the longitudinal position of its said respective adjustment member between said two end positions; said adjustment members and said indicators being mounted on and accessible from the front of said control panel; and a translucent control panel window movable from an open position to a closed position relative to said front of said control panel; said panel window being disposed immediately in front of and coplanar with at least a portion of the area of said front of said control panel when in its said closed position; said translucent window having light transmission characteristics such that, when said indicators are energized, said emitted light is visible through said control panel window to visually display the longitudinal adjustment position of their said respective adjustment members and, when said light source means are not energized, they are substantially masked from view; and further including a plurality of switches mounted on said control panel corresponding in number to the number of said groups; each of said switches being coupled to a respective one of said groups and being effective, upon activation thereof, to energize its respective group and to deenergize any previously energized group of potentiometer controls.

* * * * *